May 17, 1960 S. J. KROL 2,936,747
RESTART PREVENTION APPARATUS FOR COMBUSTION ENGINE
Filed Nov. 14, 1957
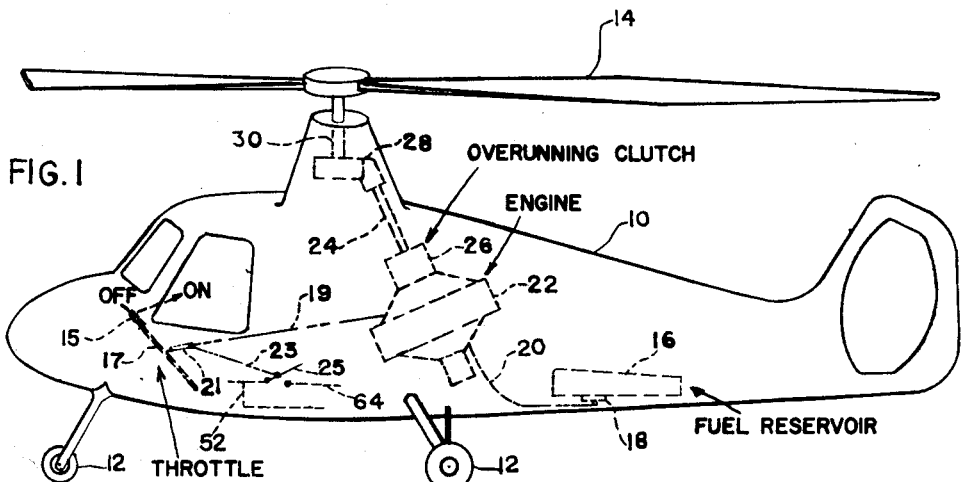
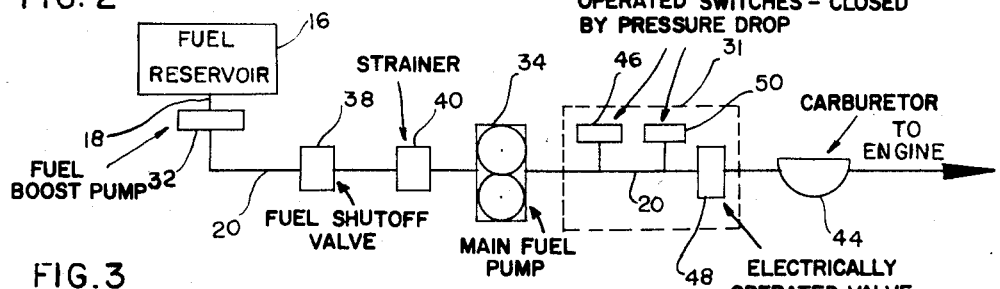
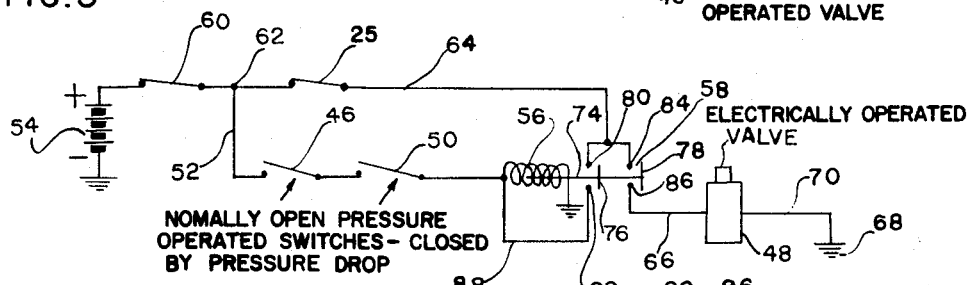
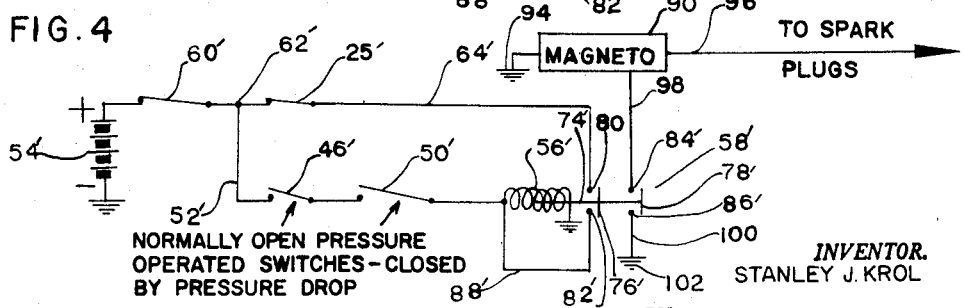
INVENTOR.
STANLEY J. KROL
BY Teller + McCormick
ATTORNEYS

United States Patent Office 2,936,747
Patented May 17, 1960

2,936,747

RESTART PREVENTION APPARATUS FOR COMBUSTION ENGINE

Stanley J. Krol, Chicopee Falls, Mass., assignor to The Kaman Aircraft Corporation, Bloomfield, Conn., a corporation of Connecticut Application November 14, 1957, Serial No. 696,540

15 Claims. (Cl. 123—136)

This general object of the invention is to provide a mechanism which is responsive to the failure of the fuel supply to the combustion engine of a vehicle, and more particularly of an aircraft, with a resultant engine stall and which thereupon serves to prevent accidental or unintended restarting of said engine upon the restoration of the fuel supply to the engine.

A more specific object of the invention is to provide a mechanism such as that above described in combination with the rotor or rotors of a helicopter and with the engine thereof, more particularly when the power transmission mechanism from the engine to the rotor or rotors includes an overruning clutch which permits freewheeling or autorotation of the rotor or rotors independently of the engine.

A further more specific object of the invention is to provide a mechanism such as that described, whether included in a helicopter or otherwise, wherein said mechanism is so connected with the throttle or other fuel control for the engine that said mechanism is rendered inoperative for its stated purpose when the fuel control is in its position of minimum fuel supply.

Still further specific objects of the invention are to provide various features of construction and arrangement which assist in the attainment of the before-stated other objects.

The drawing shows two embodiments of the invention and such embodiments will be described, but it will be understood that various changes may be made from the constructions disclosed, and that the drawing and description are not to be construed as defining or limiting the scope of the invention, the claims forming a part of this specification being relied upon for that purpose.

Of the drawing:

Fig. 1 is a schematic illustration of a helicopter with a typical engine, an engine fuel supply system, a power transmission mechanism and a throttle control.

Fig. 2 is a schematic illustration of a typical fuel system for a combustion engine and includes, within the broken line and in block form, the principal elements of the restart prevention apparatus embodying this invention.

Fig. 3 is a schematic illustration showing the restart prevention apparatus in greater detail.

Fig. 4 is a schematic illustration similar to Fig. 3 but showing an alternative restart prevention apparatus embodying the invention.

While the invention is useable with a combustion engine in any vehicle, it is particularly adaptable to helicopter use. Fig. 1 schematically shows a helicopter having a fuselage 10, a landing gear 12 and two rotors 14. The two rotors 14 are located in side-by-side relation, only one of them being shown in Fig. 1.

A fuel reservoir is indicated in dotted line form at 16 and includes therein a fuel outlet connection 18. Extending from the fuel outlet connection 18 to a combustion engine 22, which may be of either the reciprocating or turbine type, is a fuel carrying conduit indicated generally by the broken line 20. Associated with the engine 22 and with the rotors 14 is a power transmitting mechanism which includes an upwardly extending shaft 24 and preferably also includes an overrunning clutch 26 which is shown as being interposed between said engine 22 and said shaft 24. A gear mechanism, indicated generally at 28, is connected to the shaft 24 at the upper end thereof and is driven thereby. Extended upwardly from the gear mechanism 28 are two shafts 30, only one of them being shown. The two rotors 14 are respectively connected to the upper ends of the shafts 30 and are rotationally driven thereby in opposite directions.

As is conventional in helicopters, the rotor or rotors are adapted for autorotation in the event of partial or complete loss of power, said autorotation being in the normal direction or directions and requiring a suitable pitch adjustment of the rotor blades. Various means for such pitch adjustment are well known and such means are not shown. One suitable pitch changing means is shown in the Kaman and Stevens Patent No. 2,695,674 dated November 30, 1954, and entitled "Control System for Multiple Rotor Helicopters." When an overrunning clutch such as 26 is provided, autorotation of the rotor or rotors takes place when the engine stalls or otherwise ceases to supply power to the helicopter rotors.

The engine 22 may be controlled in accordance with the desires of the helicopter pilot by means of a suitable throttle control. It is to be understood that where reference is made hereinafter to the "throttle control," the term "throttle" is used in its generic sense and includes, as well as a simple fuel throttling valve, the more complex type of fuel controlling mechanisms ordinarily utilized with turbine type combustion engines. While any type of throttle control device may be used for the purposes of this invention, a preferred mechanism comprises a pivotally mounted lever 17 having a handle or grip 15. As shown, the throttle lever 17 is adapted to be moved forwardly and rearwardly about a suitable pivot at its lower end by the helicopter pilot. A linkage system indicated generally by the broken line 19 is connected to an element 21 secured intermediate the ends of the throttle lever to transmit the motion of said lever to the throttle or fuel control (not shown) at the engine 22. Movement of the throttle lever to its extreme forward position results in operation of the throttle or fuel control which terminates fuel flow to the engine and movement of said lever rearwardly from said position causes the throttle or fuel control to supply fuel to the engine for normal operation thereof.

Associated with the element 21 and the linkage system 19 is a motion transmitting mechanism, indicated by the broken line 23, for controlling an electrical switch 25. In accordance with the present invention, and as indicated in the drawing, the switch 25 is maintained in its closed position by said motion transmitting mechanism 23 when the throttle lever 17 is positioned rearwardly for normal operation of the engine 22 and is opened by said mechanism, as shown in Fig. 1, when the said lever is moved forwardly to a low power or "off" position. The functioning of said electrical switch 25 will be described more fully hereinafter.

As fuel is consumed by the engine, the level of the unused fuel in the fuel reservoir 16 may be decreased until a condition is reached wherein the fuel coverage of the fuel outlet connection 18 is but marginal. When this condition exists, the fuel may be caused to recede to a level below the fuel outlet connection 18 by certain changes in flight attitude of the aircraft. For example, in the case of the helicopter of Fig. 1, wherein the fuel outlet connection 18 is located forwardly in the fuel reservoir 16, if the aircraft assumed a nose-up attitude, fuel in the reservoir 16 would flow rearwardly away from the connection 18 and a fuel starvation induced stall of the engine 22 would result. The engine 22 would continue to operate for a time at the urging of inertia forces therewithin and would evenually come to rest while the rotors 14 would continue to rotate, but their blade picture angles would be adjusted for autorotation as previously stated.

The reoccurrence of level flight of the aircraft would result in the fuel in the reservoir 16 returning to its previous level above the outlet connection 18 and the flow of fuel to the engine 22 would be resumed. All of the foregoing might occur, in many instances, too rapidly for the helicopter pilot to have time to either change the blade pitches or adjust the throttle lever 17 and if the engine 22 were coasting at an adequate rotative velocity, it would automatically restart with the said throttle valve remaining in a position of relatively high power engine operation.

While such a high power engine restart operation results in shock loadings throughout the power plant system and is, therefore, highly objectionable in any power plant system, the consequences are particularly serious in the case of a helicopter power plant system which includes an overrunning clutch. Upon the occurrence of engine stall, the overrunning clutch 26 is operative to permit autorotation of the helicopter rotors 14 independently of the engine. Upon the restoration of fuel flow to the engine 22, the rotors 14 may well be in a state of autorotation wherein the aerodynamic forces exerted thereon have produced a speed for rotation much greater than the corresponding speed of the coasting engine. Under these conditions, the engine 22 would restart with a high power throttle control setting and under no appreciable load, and acceleration at an extremely rapid rate would result, such that the engine would pick up its load very suddenly thereby causing extreme shock loadings on the various elements of the power plant system. The restart prevention apparatus of this invention is operable to prevent the above-described high power restart operation of an engine and the detrimental shock loading effects associated therewith.

Fig. 2 shows an aircraft fuel supply system which is typical except that it includes, within the broken line 31, a portion of the restart prevention apparatus of this invention. It will be observed that the above-mentioned fuel reservoir is indicated generally at 16 with the fuel outlet connection indicated at 18. A fuel boost pump 32, associated with the outlet connection 18, is operative to pressurize the fuel so as to provide for transmission thereof through the aforementioned conduit 20 to an engine driven fuel pump 34. Interposed in the conduit 20, between the fuel boost pump 32 and the engine driven fuel pump 34, are a fuel shutoff valve 38 and a fuel strainer 40. The fuel shutoff valve 38 may be of any well-known type and may be either automatically positioned or manually positioned by the helicopter pilot. The fuel strainer 40 serves to remove foreign and undesirable particles from the stream of fuel flowing in the conduit 20 to the engine driven pump 34. From the pump 34, pressurized fuel is directed through the conduit 20 to a carburetor 44 and thence to the engine 22, the engine 22 not being shown in Fig. 2.

In accordance with the present invention, fuel responsive means are connected to the conduit 20 and are responsive to the presence or absence of fuel therewithin. Said fuel responsive means may comprise pressure sensitive switching means and such means are illustrated in block form between the pump 34 and the carburetor 44 in Fig. 2, and are indicated by the reference numerals 46 and 50. The pressure sensitive switching means 46 and 50 may comprise a pair of fluid pressure actuated switches of any well-known type, said switches preferably being held in their open position when the fuel pressure in the conduit 20 is normal and being closed when fuel pressure in said conduit falls below a predetermined minimum limit.

Also in accordance with the present invention, an engine control device is provided and has a normal position wherein the engine 22 may operate and an alternative position wherein the engine 22 is prevented from operating. Said engine control device may comprise any well-known type of electrically operated valve and such a valve is shown in block form and indicated by the reference numeral 48. Preferably, the valve 48, disposed in the conduit 20, is adapted to be closed when supplied with electric current so as to prevent the flow of fuel to the engine and to be opened so as to permit the flow of fuel to the engine upon failure of said electric current supply.

The restart prevention apparatus to which the invention particularly relates includes the fuel responsive means 46 and 50, the engine control device such as the valve 48, and an associated electrical system, particular reference being had to the Fig. 3 schematic illustration. The electrical system includes mechanism, comprising an electromagnetic relay indicated generally at 58, which is actuated by said fuel responsive means 46 and 50 and which serves upon the absence of fuel in said conduit to move said control device 48 from its said normal position to its said alternative position. Said electrical system also includes automatically acting means separate from and independent of said fuel responsive means 46 and 50 for holding said engine control device 48 in its said alternative position irrespective of the presence or absence of fuel in said conduit 20, the said automatically acting means being illustrated as comprising a holding circuit for the electromagnetic relay 58.

The fuel responsive means comprising the pressure sensitive switching means 46 and 50 are interposed in series relationship in a conductor 52 between a current source 54 and the locally grounded coil 56 of the electromagnetic relay 58. A normally closed switching means 60 may be interposed in the conductor 52 between the current source 54 and the switching means 46 and 50, the functioning of said switching means 60 being explained hereinafter. Interconnected with the conductor 52 at a location 62 between the switching means 60 and the pressure sensitive switching means 46 and 50 is a conductor 64 which extends to the relay 58 and connecting the relay 58 to the electrically operated valve 48 is a conductor 66, the valve 48 in turn being connected to a ground terminal 68 by a conductor 70. The beforementioned throttle lever operated switch 25 may be interposed in the conductor 64 between the junction 62 and the relay 58, the purpose of this switch being hereinafter stated.

Shown in Fig. 3 in its de-energized condition, the electromagnetic relay 58 comprises the coil 56, an armature 74 slidably contained therewithin, armature carried contact arms 76 and 78, stationary contacts 80 and 82, which may be electrically connected by the armature arm 76, and stationary contacts 84 and 86 which may be electrically connected by the armature arm 78. The contacts 80 and 84 are connected with the conductor 64 and the contacts 82 and 86 are respectively connected with the conductors 52 and 66, the connection with the conductor 52 being by means of a conductor 88. In its energized condition wherein the armature 74 is moved to the left by the electromagnetic forces exerted thereon by the coil 56, the said relay functions to interconnect the conductor 64 with the conductor 52 through the contact arm 76 whereby to complete the relay coil 56 holding circuit comprising the current source 54, the switches 60 and 25 and the conductors 64 and 88, and said relay also functions to interconnect the conductor 64 with the valve connected conductor 66 through the contact arm 78 whereby to close the valve 48.

Operation of the restart prevention apparatus under the aforementioned conditions of interrupted fuel flow resulting from changes in aircraft attitude will now be described. With the engine 22 operating normally and with fuel flowing uninterruptedly thereto, the switches 25 and 60 are in their closed positions as shown in Fig. 3. Also, as shown in Fig. 3, the switches 46 and 50 are in their respective open positions and the relay 58 is de-energized with the contact arms 76 and 78 breaking their respective circuits, the valve 48 being thereby opened. When the flow of fuel from the reservoir 16 is interrupted, the fuel pressure sensed by the switches 46 and 50 is lowered abnormally and the said switches are moved to their respective closed positions. The switches 46 and 50 in closing serve to energize the relay coil 56 by completing the electrical circuit comprising the current source 54, the switch 60, the junction 62, the conductor 52, and the locally grounded relay coil 56 whereby the armature is moved leftwardly carrying the contact arms 76 and 78 therewith. The contact arms 76 and 78 thereupon function respectively to interconnect the conductors 64 and 88 through the relay contacts 80 and 82 thus completing the holding circuit for the relay coil 56 and to interconnect the conductors 64 and 66 through the contacts 84 and 86 thus closing the valve 48.

It will be apparent that once the relay 58 has been so energized and the valve 48 has been closed by the closing operation of the switches 46 and 50, subsequent opening of said switches 46 and 50, as by the restoration of fuel flow in the conduit 42, will not cause de-energization of the coil 56 and opening of the valve 48, the holding circuit described above serving to maintain current flow thereto so long as the switches 60 and 25 remain in their respective closed positions. Restarting of the aircraft engine 22 with an open throttle and with the blades at autorotative pitches is thus impossible of accomplishment and the harmful effects associated with such restarting are positively avoided.

The switch 25, mentioned above, which is connected with the throttle lever 17, as described, constitutes means for releasing the above-described holding circuit whereby restarting of the engine 22 may be accomplished under the control of the helicopter pilot. In an alternative construction, not shown but nevertheless within the scope of the invention, the switch 25 may be directly operated by the helicopter pilot.

In order to restart the engine 22, the helicopter pilot must open the switch 25 as shown in Fig. 1 so as to break the holding circuit for the relay coil 56. The switch 25 may be opened by moving the throttle lever 17 forwardly to the "off" or low power position or, in the alternative, said switch may be opened manually independently of the throttle. Thereupon, the flow of fuel from the reservoir 16 having been restored and the pressure switches 46 and 50 thereby opened, the coil 56 will be de-energized and the valve 48 will be opened to permit restarting of said engine. The normal starting mechanism for the engine 22 may be utilized or, if the engine is coasting at an adequate speed, mere movement of the throttle lever rearwardly into the operating range will result in restarting. This latter starting operation cannot, of course, cause the aforementioned harmful shock loadings on the power plant system since such starting is accomplished at a low power throttle lever position and the rate of acceleration may be controlled by the helicopter pilot.

It is to be noted that while the use of a single pressure sensitive switching means is within the scope of the invention, the preferred embodiment shown in Fig. 3 and described above includes the pair of switching means 46 and 50. While upon first consideration it would seem that a single such switch would be capable of adequately performing the desired function, the utilization of a pair of pressure sensitive switching means has been found desirable for preventing accidental or unintended actuation of the restart prevention apparatus. It is known that transient low pressure conditions of short duration may occur in a fuel system as, for example, the situation where a bubble of air may become trapped in the fuel. If a single pressure switch were utilized in the conduit 20, it might well be closed by the passing of such an air bubble through said conduit and unintended actuation of the restart prevention apparatus and consequent interruption of fuel flow to the engine would result. On the other hand, an air bubble passing the pair of pressure sensitive switches 46 and 50 would be unlikely to cause actuation of the restart prevention apparatus since the two switches must be closed concurrently in order to cause energization of the coil 56. By suitable spacing of the pressure sensitive switching means 46 and 50 in the conduit 20, the likelihood of such an unintended actuation of the restart prevention apparatus may be made quite remote.

The normally closed switching means 60, mentioned above, constitutes means for deactivating the restart prevention apparatus and may comprise any ordinary type of electrical switching device adapted to be manually positioned by the helicopter pilot. The switching means 60 when opened serves to isolate the current source 54 from the electrical system whereby the restart prevention apparatus is deactivated and the valve 48 opened to allow normal operation of the engine 22. In this connection, it is to be noted that the switch 60 may be adapted to also perform the releasing function of switch 25 whereby the latter switch may be omitted from the restart prevention apparatus.

The alternative restart prevention apparatus of this invention, which is shown schematically in Fig. 4, is in many respects identical with the restart prevention apparatus of Fig. 3. The said alternative apparatus is, however, adapted to prevent unintended engine restarting, subsequent to a fuel starvation induced stall of said engine, by rendering inoperative the engine ignition system rather than by interrupting the flow of fuel to the engine.

The construction and operation of the switch 60', the coil 56', the electrical circuit comprising the current source 54' and the switches 60', 46' and 50' and the conductor 52' and the construction and operation of the holding circuit comprising the switch 25' and the conductor 64' and the relay contact arm 76' and the conductor 88' may be identical with the construction and operation of the corresponding elements of the restart prevention apparatus shown in Fig. 3. The armature contact arm 78' in this alternative apparatus, however, constitutes an engine control device which has a normal position wherein the engine 22 may operate and an alternative position wherein the engine is prevented from operating, the said contact arm serving to ground the engine ignition system upon failure of the engine fuel supply system. The alternative apparatus is adaptable for use with any electrical engine ignition system, an exemplary ignition system of the type commonly found in helicopter installations, being schematically shown in Fig. 4.

A magneto, generally indicated by the reference numeral 90, is driven by the engine and supplies a voltage potential to a conductor 96 for the engine spark plugs, not shown. A ground terminal 94 is provided for the magneto 90 and extending from the magneto 90 is a conductor 98 which terminates at the stationary contact 84' associated with the armature contact arm 78'. The second stationary contact 86' associated with the contact arm 78' is connected to a conductor 100 which extends therefrom to a ground terminal 102.

The conductor 98 may be connected with the magneto 90 in any suitable manner for preventing the normal operation of said magneto and thus rendering the ignition system inoperative when the relay contact arm 78' is moved leftwardly interconnecting the said conductor with the conductor 100 and the ground terminal 102. In accordance with preferred practice, the connection between the magneto 90 and the conductor 98 is accomplished in a manner whereby the level of voltage which must be accommodated by the conductors 98 and 100 and particularly by the contacts 84' and 86' and the relay arm 78' is as low as possible. Thus for example, where the magneto is of the well known type which includes a primary coil associated with a circuit breaker connected with the ground terminal 94 for suitably timing voltage pulses which are supplied to the spark plugs from a secondary coil, the conductor 98 may be connected to the magneto primary coil to prevent current therein.

When the relay coil 56' is energized as a result of the switches 46' and 50' being closed in response to an interruption in fuel flow through the conduit 20, the armature carried contact arms 76' and 78' are, as described above, moved leftwardly to the closed position. The relay contact arm 76', as before, interconnects the conductors 64' and 52' through the conductor 88' thus completing the holding circuit for the relay coil 56'. The relay contact arm 78' connects the conductor 98 to the conductor 100 and as a result, the primary coil of the magneto 90 is shunted to ground at the terminal 102. The ignition system for the engine is thus rendered inoperative whereby the resumption of fuel flow from the reservoir 16 through the conduit 20 and the resultant opening of the switches 46' and 50' cannot result in a high power restart of the engine 22.

Restarting of the engine 22 may be safely accomplished in the manner set forth above for the apparatus of Fig. 3; that is, the helicopter pilot may move the throttle lever forwardly to the "off" or low power position thereby opening the switch 25, deenergizing the coil 56' and disconnecting the shunt ground 102 and the primary coil of the magneto 90. The pilot may then move the throttle lever rearwardly for normal engine operation whereupon starting may be accomplished either automatically or by means of the engine starter mechanism.

The invention claimed is:

1. In a helicopter having a fuselage and a lifting rotor and an engine connected with the rotor for driving it, the combination of a fuel reservoir, a fuel supply conduit extending from said reservoir to said engine, means connected with said fuel supply conduit and responsive to the presence or absence of fuel therein, an engine control device having a normal position wherein the engine may operate and having an alternative position wherein said engine is prevented from operating, mechanism actuated by said fuel responsive means and serving upon the absence of fuel in said conduit to move said control device from its normal position to its alternative position, and automatically acting means separate from and independent of said fuel responsive means for holding the said engine control device in its said alternative position irrespective of the presence or absence of fuel in said conduit.

2. In a helicopter having a fuselage and a lifting rotor and an engine and power transmitting mechanism connecting said engine with said rotor and including an overrunning clutch which enables the rotor to autorotate with the engine stopped and without load, the combination of a fuel reservoir, a fuel supply conduit extending from said reservoir to said engine, means connected with said fuel supply conduit and responsive to reduced pressure therein, an engine control device having a normal position wherein the engine may operate and having an alternative position wherein the engine is prevented from operating, mechanism actuated by said pressure responsive means and serving upon the existence of reduced pressure in said conduit to move said control device from its said normal position to its said alternative position and thereby prevent engine operation, and automatically acting means separate from and independent of said reduced pressure responsive means for holding the engine control device in its said alternative position irrespective of the continuance of said reduced pressure in said conduit so as to prevent the engine from starting without load and then picking up load suddenly.

3. In a helicopter having a fuselage and a lifting rotor and an engine and power transmitting mechanism connecting said engine with said rotor and including an overrunning clutch which enables the rotor to autorotate with the engine stopped and without load and a manually operable throttle control for said engine, the combination of a fuel reservoir, a fuel supply conduit extending from said reservoir to said engine, means connected with said fuel supply conduit and responsive to reduced pressure therein, an engine control device having a normal position wherein the engine may operate and having an alternative position wherein the engine is prevented from operating, mechanism actuated by said pressure responsive means and serving upon the existence of reduced pressure in said conduit to move said control device from its said normal position to its said alternative position and thereby prevent engine operation, automatically acting means separate from and independent of said reduced pressure responsive means for holding the engine control device in its said alternative position irrespective of continuance of said reduced pressure in said conduit, and means operated by said throttle control for releasing said automatically acting holding means when said throttle control is positioned for low power engine operation so as to prevent the engine from starting without load and then picking up load suddenly.

4. In combination with a combustion engine and a fuel supply system therefor, an apparatus comprising means associated with said fuel supply system and responsive to the presence or absence of fuel at a point in said supply system, an engine control device having a normal position wherein the engine may operate and having an alternative position wherein the engine is prevented from operating, mechanism actuated by said fuel responsive means and serving upon the absence of fuel at said point in said supply system to move said control device from its said normal position to its said alternative position, and automatically acting means separate from and independent of said fuel responsive means for holding the engine control device in its said alternative position irrespective of the presence or absence of fuel at said point in said supply system.

5. In combination with a combustion engine and a fuel reservoir and a conduit for establishing communication between said fuel reservoir and said engine, an apparatus comprising means connected with said fuel supply conduit and responsive to the pressure of fuel therein, an engine control device having a normal position wherein the engine may operate and having an alternative position wherein the engine is prevented from operating, mechanism actuated by said fuel pressure responsive means and serving upon the existence of reduced pressure in the said conduit to move said control device from its said normal position to its said alternative position, and automatically acting means separate from and independent of said fuel pressure responsive means for holding the engine control device in its said alternative position irrespective of continuance of reduced pressure in the said conduit.

6. In combination with a combustion engine and a fuel reservoir and a conduit for establishing communication between said fuel reservoir and said engine, an apparatus comprising means connected with said fuel supply conduit and responsive to the pressure of fuel therein, an engine control device having a normal position wherein the engine may operate and having an alternative position wherein the engine is prevented from operating, mechanism actuated by said fuel pressure responsive means and serving upon the existence of reduced pressure in the said conduit to move said control device from its said normal position to its said alternative position, automatically acting means separate from and independent of said fuel pressure responsive means for holding the engine control device in its said alternative position irrespective of the continuance of reduced pressure in the said conduit, and means for releasing said automatic holding means.

7. In combination with a combustion engine and a fuel reservoir and a conduit for establishing communication between said fuel reservoir and said engine and a manually operable throttle control for said engine, an apparatus comprising means connected with said fuel supply conduit and responsive to the pressure of fuel therein, an engine control device having a normal position wherein the engine may operate and having an alternative position wherein the engine is presented from operating, mechanism actuated by said fuel pressure responsive means and serving upon the existence of reduced pressure in the said conduit to move said control device from its said normal position to its said alternative position, automatically acting means separate from and independent of said fuel pressure responsive means for holding the engine control device in its said alternate position irrespective of the continuance of reduced pressure in the said conduit, and means operated by said throttle control for releasing said automatically acting holding means when said throttle control is positioned for low power engine operation.

8. In combination with a combustion engine and a fuel reservoir and a conduit for establishing communication between said fuel reservoir and said engine, an apparatus comprising means connected with said fuel supply conduit and responsive to the pressure of fuel therein, a valve disposed within said conduit and having an open position whereby fuel is allowed to flow to the engine and a closed position whereby fuel is prevented from flowing to the engine, mechanism actuated by said fuel pressure responsive means and serving upon the existence of reduced pressure in said conduit to close said valve, automatically acting means separate from and independent of said fuel pressure responsive means for holding the valve in its said closed position irrespective of the continuance of reduced pressure in said conduit, and means for releasing said automatic holding means.

9. In combination with a combustion engine and a fuel reservoir and a conduit for establishing communication between said fuel reservoir and said engine, an apparatus comprising pressure sensitive switching means connected with said fuel supply conduit and responsive to the pressure of fuel therein, a valve disposed within said conduit and having an open position whereby fuel is allowed to flow to the engine and a closed position whereby fuel is prevented from flowing to the engine, an electromagnetic relay actuated by said pressure sensitive switching means and serving upon the existence of reduced pressure in said conduit to close said valve, automatically acting means separate from and independent of said pressure sensitive switching means for holding said valve in its said closed position irrespective of the continuance of reduced pressure in said conduit, and means for releasing said automatic holding means.

10. In combination with a combustion engine and a fuel reservoir and a conduit for establishing communication between said fuel reservoir and said engine, an apparatus comprising pressure sensitive switching means connected with said fuel supply conduit and responsive to the pressure of fuel therein, an electrically operated valve disposed within said conduit and having an open position whereby fuel is allowed to flow to the engine and a closed position whereby fuel is prevented from flowing to the engine, an electric circuit for connecting a current source with said valve, an electromagnetic relay actuated by said pressure sensitive switching means and having a coil and a plurality of contact arms, an electric holding circuit for said relay coil, one of said relay contact arms serving upon the existence of reduced pressure in said conduit to complete said electric valve circuit closing the valve and another of said contact arms concurrently completing said holding circuit for said relay coil and thereby maintaining the valve in said closed position irrespective of the continuance of reduced pressure in said conduit, and means separate from and independent of said pressure sensitive switching means for disconnecting said relay coil holding circuit.

11. In combination with a combustion engine and a fuel reservoir and a conduit for establishing communication between said fuel reservoir and said engine and a manually operable throttle control for said engine, an apparatus comprising pressure sensitive switching means connected with said fuel supply conduit and responsive to the pressure of fuel therein, an electrically operated valve disposed within said conduit and having an open position whereby fuel is allowed to flow to the engine and a closed position whereby fuel is prevented from flowing to the engine, an electric circuit for connecting a current source with said valve, an electromagnetic relay actuated by said pressure sensitive switching means and having a coil and a plurality of contact arms, an electric holding circuit for said relay coil, one of said contact arms serving upon the existence of reduced pressure in the said conduit to complete said electric valve circuit closing the valve and another of said contact arms concurrently completing said holding circuit for said relay coil and thereby maintaining the valve in said closed position irrespective of the continuance of reduced pressure in the said conduit, and switching means operated by said throttle control for disconnecting said relay coil holding circuit when said throttle control is positioned for low power engine operation.

12. In combination with a combustion engine and a fuel reservoir and a conduit for establishing communication between said fuel reservoir and said engine and a manually operable throttle control for said engine, an apparatus comprising an electrical current source, an electrically operated valve, an electromagnetic relay having a coil and a plurality of contact arms, a first conductor interconnecting the said current source and a first side of all of said contact arms, a switch interposed in said first conductor and opened by movement of said throttle control to a low power position and closed by movement of said throttle control to a high power position, a second conductor interconnecting said current source and said relay coil and having interposed therein pressure sensitive switching means connected with the said fuel supply conduit and opened when fuel pressure therein is normal and closed when fuel pressure therein is reduced to an abnormal level, a third conductor interconnecting the second side of one of said relay contact arms and said electrically operated valve, said valve being closed when said one relay contact arm is positioned so as to interconnect said first and third conductors, and a fourth conductor interconnecting the second side of another of said relay contact arms and the relay coil, said relay coil being thereby maintained in its energized condition when said relay arm is positioned so as to interconnect said first and fourth conductors and said throttle control operated switch is closed.

13. In combination with a combustion engine and a fuel reservoir and a conduit for establishing communication between said fuel reservoir and said engine and an ignition system for said engine, and apparatus comprising means connected with said fuel supply conduit and responsive to the pressure of fuel therein, electrical switching means having a normal position wherein the engine may operate and having an alternative position wherein the said ignition system is made inoperative and the engine is prevented from operating, mechanism actuated by said fuel pressure responsive means and serving upon the existence of reduced pressure in the said conduit to move said switching means from its said normal position to its said alternative position, automatically acting means separate from and independent of said fuel pressure responsive means for holding said switching means in its said alternative position irrespective of the continuance of reduced pressure in said conduit, and means for releasing said automatic holding means.

14. In combination with a combustion engine and a fuel reservoir and a conduit for establishing communication between said fuel reservoir and said engine and an ignition system for said engine, an apparatus comprising pressure sensitive switching means connected with said fuel supply conduit and responsive to the pressure of fuel therein, electrical switching means having a normal position wherein the engine may operate and having an alternative position wherein the said ignition system is made inoperative and the engine is prevented from operating, an electromagnetic relay actuated by said pressure sensitive switching means and having a coil and a plurality of contact arms, an electric holding circuit for said relay coil, one of said contact arms constituting the aforesaid electrical switching means and being moved to its said alternative position upon the existence of reduced pressure in said conduit and another of said relay contact arms concurrently completing said relay coil holding circuit and thereby maintaining said one relay arm in its said alternative position irrespective of the continuance of reduced pressure in said conduit, and means separate from and independent of said pressure sensitive switching means for disconnecting said relay coil holding circuit.

15. In combination with a combustion engine and a fuel reservoir and a conduit for establishing communication between said fuel reservoir and said engine and a manually operable throttle control for said engine and an ignition system for said engine including at least one magneto and a plurality of spark plugs, an apparatus comprising an electrical current source, an electromagnetic relay having a coil and a plurality of contact arms, a first conductor interconnecting said current source and a first side of one of said contact arms, a switch interposed in said first conductor and opened by movement of said throttle control to a low power position and closed by movement of said throttle control to a high power position, a second conductor interconnecting said current source and said relay coil and having interposed therein pressure sensitive switching means connected with said fuel supply conduit and opened when fuel pressure therein is normal and closed when fuel pressure therein is reduced to an abnormal level, a third conductor interconnecting the second side of said one relay contact arm and the relay coil and thereby serving to maintain energization of said coil when said relay arm is positioned so as to interconnect said first and third conductors and said throttle control operated switch is closed, a fourth conductor interconnecting the first side of another of said relay contact arms with said magneto, and a fifth conductor interconnecting the second side of said contact arm to a ground terminal, said contact arm thereby serving to ground said magneto when positioned so as to interconnect said fourth and fifth conductors.

No references cited.